April 15, 1958
E. H. JACOBS ET AL
2,830,830
SEVERABLE PIPE COUPLING WITH PIVOTED
LOCKING DETENT AND SEPARATE SECURING
STRAP FOR THE FEMALE COUPLER
Filed June 3, 1955
2 Sheets-Sheet 1
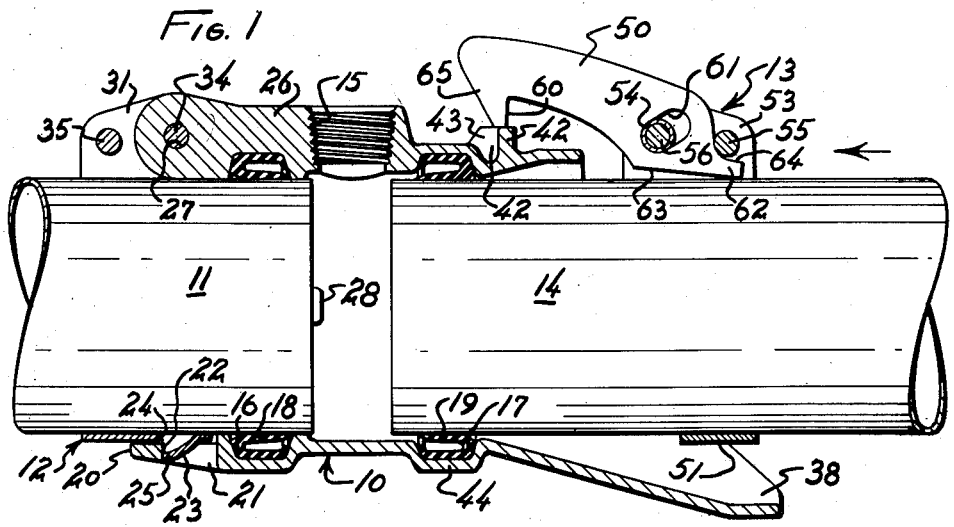
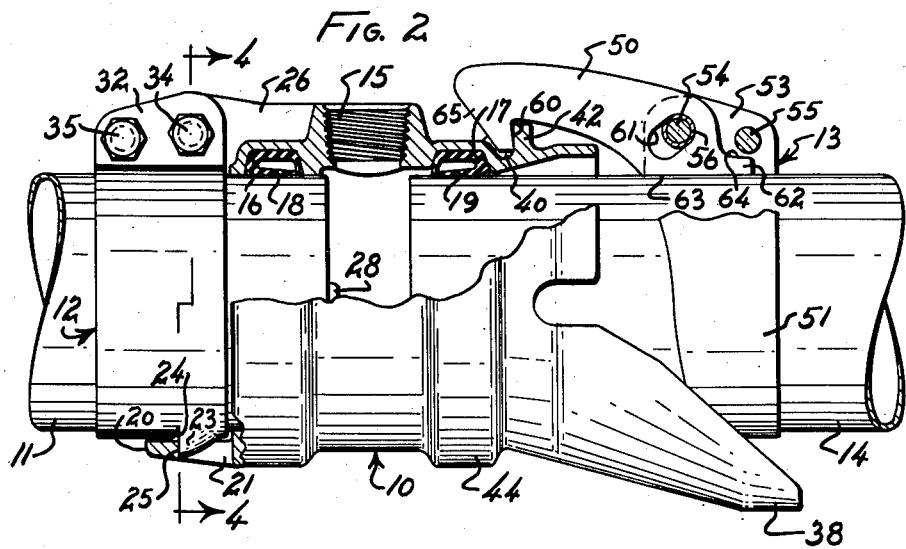
INVENTORS
ELLIS H. JACOBS
RONALD G. BILLYARD
BY
ATTORNEYS April 15, 1958
E. H. JACOBS ET AL
2,830,830
SEVERABLE PIPE COUPLING WITH PIVOTED
LOCKING DETENT AND SEPARATE SECURING
STRAP FOR THE FEMALE COUPLER
Filed June 3, 1955
2 Sheets-Sheet 2
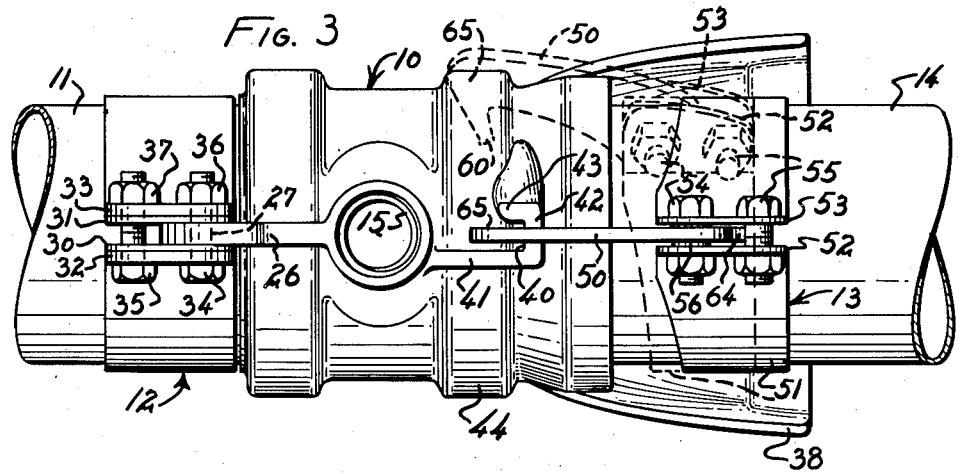
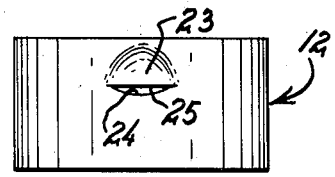
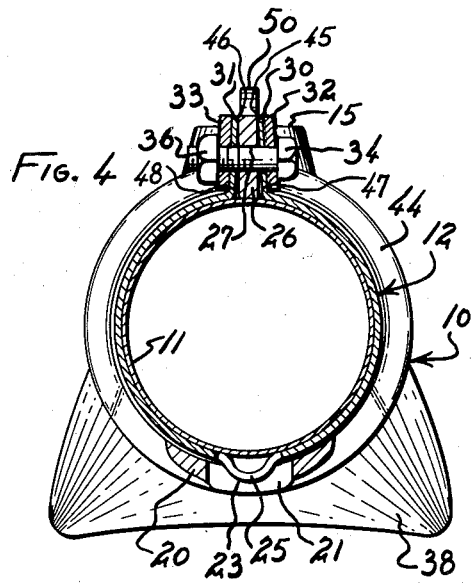
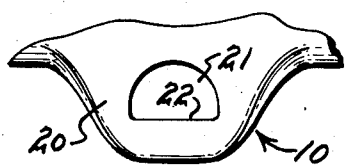
INVENTORS
ELLIS H. JACOBS
RONALD G. BILLYARD
BY
ATTORNEYS

United States Patent Office 2,830,830
Patented Apr. 15, 1958

2,830,830

SEVERABLE PIPE COUPLING WITH PIVOTED LOCKING DETENT AND SEPARATE SECURING STRAP FOR THE FEMALE COUPLER

Ellis H. Jacobs, Oakland, and Ronald G. Billyard, San Francisco, Calif., assignors to Pacific Pipe Company, San Francisco, Calif., a corporation of California Application June 3, 1955, Serial No. 513,077

5 Claims. (Cl. 285—6)

This invention relates to an improved quick-acting coupling for joining two sections of pipe together.

The present invention is particularly useful with portable irrigation pipe, because it solves the problem of quickly connecting and disconnecting successive lengths of pipe. By using the present invention, a line of pipe can be quickly dis-assembled, the sections moved to another location and a pipe line quickly re-assembled there in the same or in a different order.

An important object of the invention is to provide a coupling whereby any two sections of pipe can be coupled together or disconnected from each other without the workmen having to touch the coupling or even to come near it. Moreover, the coupling cannot accidentally become disconnected. The coupling is connected merely by pushing the end of a pipe section with a male coupler on it into a female coupler on another pipe section. The coupling is disconnected by rotating the pipe having the male coupler through a small arc, while pushing it forward, and then retracting it.

Another object of the invention is to solve the problem of retaining the female coupler securely on the end of the pipe. In the past, female couplers of this general type have frequently been blown off the end of the pipe when the water pressure was applied. In an attempt to overcome this difficulty, structures were devised that not only failed to solve the main problem adequately, but also led to other troubles, such as crushing in part of the pipe wall, thereby causing leaks. Some prior art couplers were installed by perforating the pipe, which made it necessary to install special gaskets, grommets, etc. The present invention solves this problem by employing a clamp which is an entirely separate piece from the female coupler, but is joined to it. The clamp is wrapped around the pipe and clamped tightly to it; the female coupler is linked rigidly to the clamp at two points.

Other objects and advantages of the invention will appear from the following description of a preferred embodiment, presented in accordance with 35 U. S. C. 112.

In the drawings:

Fig. 1 is a view in side elevation and in longitudinal section of a pipe coupling embodying the principles of the present invention. The couplers are shown installed on the facing ends of two sections of pipe, the remainder of the pipe being broken off to conserve space. In this view, the pipe has not been completely coupled, the male coupler being shown just before its locking latch drops into the pocket or catch of the female coupler to complete the coupling.

Fig. 2 is a view partly in side elevation and partly in section of the coupler of Fig. 1, showing it in its fully coupled position.

Fig. 3 is a top plan view of the coupling of Figs. 1 and 2. In broken lines the male coupler is shown rotated and pushed forward during the uncoupling operation, while in solid lines it is shown in its coupled position.

Fig. 4 is a view in section taken along the line 4—4 in Fig. 2.

Fig. 5 is a bottom plan view of the clamp element alone, which is wrapped around the pipe and to which the female coupler is linked.

Fig. 6 is a fragmentary bottom plan view of a portion of the female coupler, showing the perforation which is used to link the female coupler to the clamp.

The main elements of our new coupling are a female coupler 10 which is anchored to the end portion of a pipe 11 by a sleeve, clamp, or strap 12; and a male coupler 13 that is clamped around a pipe section 14. Since the couplers 10 and 13 are separate from the pipe sections 11 and 14, there may be one female coupler 10 and one male coupler 13 on each pipe section 11 or 14, or some sections may have female couplers 10 at both ends and other pipe sections may have male couplers 13 at both ends.

The female coupler 10 comprises a generally tubular sleeve, preferably of metal, such as cast aluminum, adapted to encircle one pipe section 11 at one end and to receive an adjacent pipe section 14 at its outer end. The inner end of the female coupler 10 is connected, in a manner described below, to the clamp or strap 12.

The female coupler 10 shown in the drawings is provided with a threaded riser outlet 15, to which may be connected a sprinkler head (not shown) or smaller-diameter pipe. This riser outlet need not be a part of the coupler 10, though that is very convenient and practical. A pair of annular recesses 16 and 17 each retain a gasket 18 or 19; the gaskets 18, 19 prevent any leakage at the connection, but have nothing to do with physically holding either coupler 10 or 13 to the pipe sections 12 or 14. As can be seen in Fig. 2, the ends of the two pipe sections 11 and 14 are spaced apart from each other in the completed coupling to permit passage of liquid into the riser outlet 15. The split lips of the gaskets 18 and 19 utilize the pressure of the liquid to enchance the sealing action, so that there can be no leakage between the coupler 10 and the pipe sections 11 and 14.

On the lower surface of the female coupler 10, an axial portion 20 extends along the pipe 11 away from its outer end, and is connected to the clamp 12. This connection is provided by means of a perforation 21, through the extension 20, which surrounds and has one face 22 engaging a turned out lip 23 that is part of the clamp 12. It is important to provide a strong secure engagement at this point; so the engaging face 22 is made as nearly vertical and straight as is practical. For that reason also, the lip 23 is made by having a sharp shear 24 along a curve; then when the lip 23 is drawn out, its edge 25 will be straight, or substantially so.

Diametrically opposite the lower extension 20, the female coupler 10 is provided with an axial tongue 26 which extends out parallel to the extension 20 and is provided adjacent its outer end with a bolt-receiving opening 27. The clamp or strap 12, which preferably comprises a sleeve of malleable metal curved around the pipe 11, is formed at its upper end into a pair of radially outwardly extending flanges 30 and 31. A pair of bolt bearing plates 32 and 33, of the same general shape and area are provided as reinforcing members, and suitable aligned openings through the flanges 30, 31 and plates 32, 33 receive bolts 34 and 35. The bolt 34 also passes through the opening 27 in the tongue 26 which is thereby secured between the two flanges 30, 31. Thus the tongue 26 is secured to the clamp 12 and serves as a spacer between the flanges 30 and 31. The bearing plates, 32, 33 are of thicker, more rigid metal than the strap 12 and its flanges 30, 31, so that the nuts 36, 37 can be tightened on their respective bolts 34, 35 without bending the flanges 30, 31.

For installation, the strap 12 and female coupler 10 may be loosely linked together, with the face 22 of the perforation 21 engaging the edge 25 of the lip 23 and with the bolts 34 and 35 in place, joining the coupler tongue 26 to the sleeve 12. This assembly may be slipped over the end of the pipe section 11 until the end of the pipe section 11 engages the stop buttons 28. Then the female coupler 10 is spaced correctly relative to the end of the pipe section 11 as shown in the drawings, where the pipe section 11 ends approximately at the inner edge of the riser opening 15. Then the nuts 36 and 37 are tightened, causing the strap 12 to wrap itself tightly around the pipe with a tight clamping action around practically the full circumference of the pipe 11, the bearing plates 32, 33 preventing the flanges 30, 31 from bending inwardly. Usually the bolt 34 which passes through the tongue 26 is tightened first, and then the bolt 35 is brought into the same amount of compression, so that flanges 30, 31 and bearing plates 32, 33 (see Fig. 3) are all parallel to each other, axially speaking. However, as shown in Fig. 4, the tops and bottoms of the flanges 30, 31 and plates 32, 33 are not parallel to each other. The reason for this is that when the bolts 34 and 35 are first tightened, the flanges 30, 31 are heeled in at the top, as shown at 45, 46, leaving gaps 47, 48 at the bottom. Further tightening moves the flanges 30, 31 in toward each other at the bottom, making the gaps 47, 48 smaller, but they remain to the end, because they indicate that the force is being transmitted to the remainder of the clamp 12 to give a wrapping action, instead of merely tightening the flanges 30, 31 toward each other and leaving the clamp 12 loose. This use of one member 12 for clamping to the pipe and another member 10 to serve as the actual coupler and to house the sealing gaskets 18 and 19 achieves a secure anchoring of the female coupler without in any way damaging or deforming the pipe section 12.

The outer end of the female coupler 10 is provided on its lower side with a lip 38 that is adapted to guide the end of the pipe section 14 into the female coupler and into engagement with the sealing gasket 19. The female coupler 10 is also provided with a catch or pocket 40 preferably formed by a rib 41 which extends out axially from the riser outlet 15 in line with the tongue 26, though on the opposite side of the riser outlet 15. The end of the rib 41 joins perpendicular rib 42 that leads to a short axial portion 43 parallel to the rib 41. The latch pocket 40 is thus bounded on three sides by the rib 41 and portions 42 and 43. Since the gasket 19 is seated in a recess 17, the outer wall of the coupler 10 is formed with a raised portion 44. The rib 41 extends somewhat beyond this raised portion 44, so that the pocket 40 is deeper and makes a more secure latch than it would if it were over the raised portion 44.

The male coupler 13 is joined to the female coupler 10 by a latch 50, supported pivotally in relation to a clamp portion 51. The clamp portion 51 is a simple strap provided with a pair of radially out-turned flanges 52, 53 at its upper end. The clamp portion 51 is tightened around the pipe section 14 by a pair of bolts 54, 55 which extend through suitable openings in the flanges 52, 53 and act to wrap the strap 51 around the pipe wall, in a way similar to the way the strap 12 is secured. To assure proper clearance and freedom for the latch 50, the flanges 52, 53 are spaced apart by a spacer sleeve 56 around the bolt 54.

The latch member 50 comprises a flat metal bar with a hook 60 at its outer end, a perforation 61 adjacent its inner end and a projecting stop portion 62 therebeyond. The perforation 61 comprises a diagonal slot by which the latch 50 is pivotally mounted on the sleeve 56. The diagonal slant gives a cam action, due to the fact that it slopes down toward the female coupler 10. The latch 50 also has a straight base portion 63 adapted normally to lie flat along the pipe wall and to form one edge of the stop portion, or which extends rear-wardly and provides a shoulder 64 that acts as a stop member by engaging the bolt 55, thereby limiting the swing of the latch 50.

The outer end 65 of the latch hook 60 is also made diagonally, to act as a cam, and it will be noted that the slope of the outer end 65 is in the opposite direction from that of the cam slot 61, in fact it may be approximately perpendicular to the diagonal slot 61. The diagonal slot 61 is preferably about 40° although it may vary from about 60° down to about 10°, with respect to the horizontal.

*Operation*

In operation, the coupling is joined by shoving the male-end section 14 into the female coupler 10, using the lip 38 as a guide. When the outer cammed end 65 of the latch hook 60 engages the transverse ribbed portion 42 it transmits the force along its length and causes the latch 50 to move up and swing up on the diagonal slot 61, as shown in Fig. 1, so that the latch 50 moves both upwardly and rearwardly with respect to the spacer sleeve 56. This swings and lifts the hook 60 so that it will ride over the transverse rib 42 into the pocket 40. Then, the force being off it, it falls down. Once the hook 60 is in the pocket 40, the diagonal slot 61 acts as a lock that prevents uncoupling, because no matter how hard the pipe connections 11 and 14 are pulled away from each other, they only act to tighten the latching action of the hook 60 against the rib 42.

When it is desired to uncouple the pipe sections 11 and 14, the male section 14 is pushed inwardly until the hook passes beyond the end of the rib 43, and then the pipe section 14 is rotated through a small arc to carry the hook 60 out of the pocket 40 and away from the axial rib 43. The hook 60 is then free of all interference and the pipe section 14 can be retracted simply by pulling it away from the female coupler 10.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A pipe coupling which can be joined and unjoined without having to touch the coupler elements, including in combination: a male coupler secured to a first pipe section at a spaced distance from one end, supporting a pivot transverse to the axis of the pipe, and having a pivoted latch with a base portion having a straight edge normally adapted to lie flat along the pipe wall and a closed diagonal straight slot above said edge by which it is mounted on said pivot for rotational and translational movement, the portion of said slot nearer said pipe end being closer to said pipe wall than the remainder of said slot, said latch also having an outer hooked end portion extending up and out beyond said base portion; a female coupler adapted to be positioned around the end portion of a second pipe section and extend beyond said end, having a pair of interior gaskets, one adapted to engage the outer wall of said second pipe section at all times, the other to engage the outer wall of said first pipe section when coupled thereto, said female coupler having a rim defining a latch pocket on its outer wall adapted for engagement by the hooked outer end of said latch riding over said rim into said pocket for linking said male and female couplers together.

2. The coupling of claim 1, wherein the outer face of said hooked outer end is sloped along a straight edge oppositely to and approximately perpendicularly to the slope of the bottom of said diagonal slot.

3. The coupling of claim 1 wherein there is a stop member parallel to said pivot and spaced further than said pivot from said pipe end and a rearwardly extending stop portion of said latch extending between said pipe and said first mentioned stop member, whereby the swinging movement of said latch about its pivot is limited.

4. The coupling of claim 1, wherein said diagonal slot extends at an angle of about 40°.

5. In a pipe coupling the combination of a coupler element adapted to be positioned around the end portion of a pipe and to receive another pipe, said coupler element having a pair of interior gaskets, one adapted to engage the outer wall of each said pipe, and having a pair of diametrically-opposite axial extensions, one having a perforation therethrough with an outboard edge thereof substantially linear and vertical, the other comprising a bar-like tongue having a bolt opening therethrough; a separate thin clamp wrapped tightly around the same pipe as said coupler element and having a central projection for engagement with said linking means provided by a lip forced out from the wall thereof, the edge thereof being formed by a curved shearing of the wall, so that on being drawn out it is substantially linear and having a pair of generally parallel flanges clamped together by bolts with said bar-like tongue therebetween, to hold said coupler element securely in place; and a pair of bearing plates of substantially greater thickness than said flanges on the opposite sides of said flanges from said tongue to receive the thrust of the bolts used to tighten said clamp.

References Cited in the file of this patent

UNITED STATES PATENTS

| | | |
|---|---|---|
| 280,169 | Gerhauser | June 26, 1883 |
| 2,494,855 | Anderson | Jan. 17, 1950 |
| 2,499,476 | Eyerly | Mar. 7, 1950 |
| 2,573,203 | Kinney | Oct. 30, 1951 |
| 2,670,222 | Dragon | Feb. 23, 1954 |
| 2,704,679 | Stilwell | Mar. 22, 1955 |